United States Patent [19]

Bonsu

[11] Patent Number: 4,770,742

[45] Date of Patent: Sep. 13, 1988

[54] METHOD FOR INCREASING THE EFFICIENCY OF A CAUSTICIZING PROCESS

[75] Inventor: Alexander K. Bonsu, Pointe Claire, Canada

[73] Assignee: Domtar Inc., W. Montreal, Canada

[21] Appl. No.: 82,497

[22] Filed: Aug. 7, 1987

[51] Int. Cl.$^4$ .............................................. D21C 11/04
[52] U.S. Cl. ................................... 162/29; 423/183; 423/DIG. 3; 162/30.11
[58] Field of Search ..................... 162/29, 30.1, 30.11; 423/182, 183, 207, 432, DIG. 3

[56] References Cited

U.S. PATENT DOCUMENTS

| | | | |
|---|---|---|---|
| 1,815,646 | 7/1931 | Bates et al. | 162/30.1 |
| 2,552,183 | 5/1951 | Knight | 162/30.11 |
| 4,302,281 | 11/1981 | Ryham | 162/30.1 |
| 4,536,253 | 8/1985 | Bertelsen | 162/30.11 |
| 4,668,342 | 5/1987 | Blackwell | 162/30.11 |

FOREIGN PATENT DOCUMENTS

WO85/01966 5/1985 PCT Int'l Appl. .................... 162/29

Primary Examiner—Kenneth M. Schor
Assistant Examiner—K. M. Hastings
Attorney, Agent, or Firm—Antoine H. Gauvin

[57] ABSTRACT

A method for increasing the efficiency of the causticizing process which comprises: (a) adding to a green liquor between 78 and 82% of the stoichiometric amount of lime necessary to react with the amount of $Na_2CO_3$ present in the green liquor to obtain a white liquor containing NaOH and lime mud. The white liquor is then clarified by extracting the lime mud present to obtain a white liquor having a total solid concentration of about 10–60 grams/liter. The supernatant liquid of the white liquor is treated with an additional amount of lime to increase the causticity to about 87%, then allowing further causticizing reaction between the lime and $Na_2CO_3$. The remaining lime mud present is removed to obtain a white liquor which has the causticity of about 87%. One is thus able to raise the causticity of partially clarified white liquor following the normal causticizing process, the mud present being sufficient to increase causticity without substantially decreasing settling rate.

10 Claims, 2 Drawing Sheets

METHOD FOR INCREASING THE EFFICIENCY OF A CAUSTICIZING PROCESS

This invention relates to a method of increasing the efficiency of the causticizing process related to the making of white liquor from green liquor in a pulping operation in adding lime by steps.

BACKGROUND OF THE INVENTION

In the manufacture of alkaline-process of making pulps, the wood is cooked with white liquor comprising NaOH, sodium carbonate, and sulfur salts of sodium such as sodium sulfate, sulfide, thiosulfide. After cooking, the liquor is evaporated, the organic materials burned and the inorganic materials are disolved to obtain the green liquor. This green liquor is generally discharged in a slaker together with lime. The lime produces calcium hydroxide which is further reacted in reactors mounted in series called causticizers, and following the causticizers, the lime mud (CaCO$_3$) is filtered such as with rotating drums. Thus, this process generates white liquor by converting the Na$_2$CO$_3$ to caustic soda (NaOH) and lime mud CaCO$_3$, CaO+H$_2$O→Ca(OH)$_2$+Na$_2$CO$_3$→2NaOH+CaCO$_3$. The process is illustrated for instance in U.S. Pat. No. 4,536,236 dated Aug. 20, 1985 as invented by Bertelsen.

THE INVENTION

A method has now been found to increase the efficiency of the caustizing process which comprises:
(a) adding to a green liquor between 78 and 82% of the stoichiometric amount of lime necessary to react with the amount of Na$_2$CO$_3$ present in the green liquor to obtain a white liquor containing NaOH and lime mud,
(b) clarifying said white liquor by extracting the lime mud present to obtain a white liquor having a total solid concentration of about 10–60 grams/liter, preferably 20–40 and most preferably 20 grams/liter,
(c) taking the supernatant liquid of said white liquor containing about 10–60 grams/liter, preferably 20–40 and most preferably 20 grams/liter of total solid concentration and adding an additional amount of lime to increase the causticity to about 87%,
(d) allowing further causticizing reaction between the lime and sodium carbonate, and
(e) removing the remaining lime mud present to obtain a white liquor which has the causticity of about 87%.

In accordance with the present invention by having step (c), one is able to raise the causticity of partially clarified white liquor following the normal causticizing process.

The white liquor is partially clarified before adding the extra lime. By so doing, it has been found that:
1— the lime mud must be present to accelerate the causticizing reaction,
2— using only part of the lime mud initially present to ensure good settling rate at high causticity. This settling rate is not affected much by excess lime and high causticity compared to high solids concentration as seen hereinbelow.

DETAILED DESCRIPTION OF THE DRAWINGS

In the drawings which illustrate a particular embodiment of the invention.

DETAILED DESCRIPTION OF THE INVENTION

Figure 1:
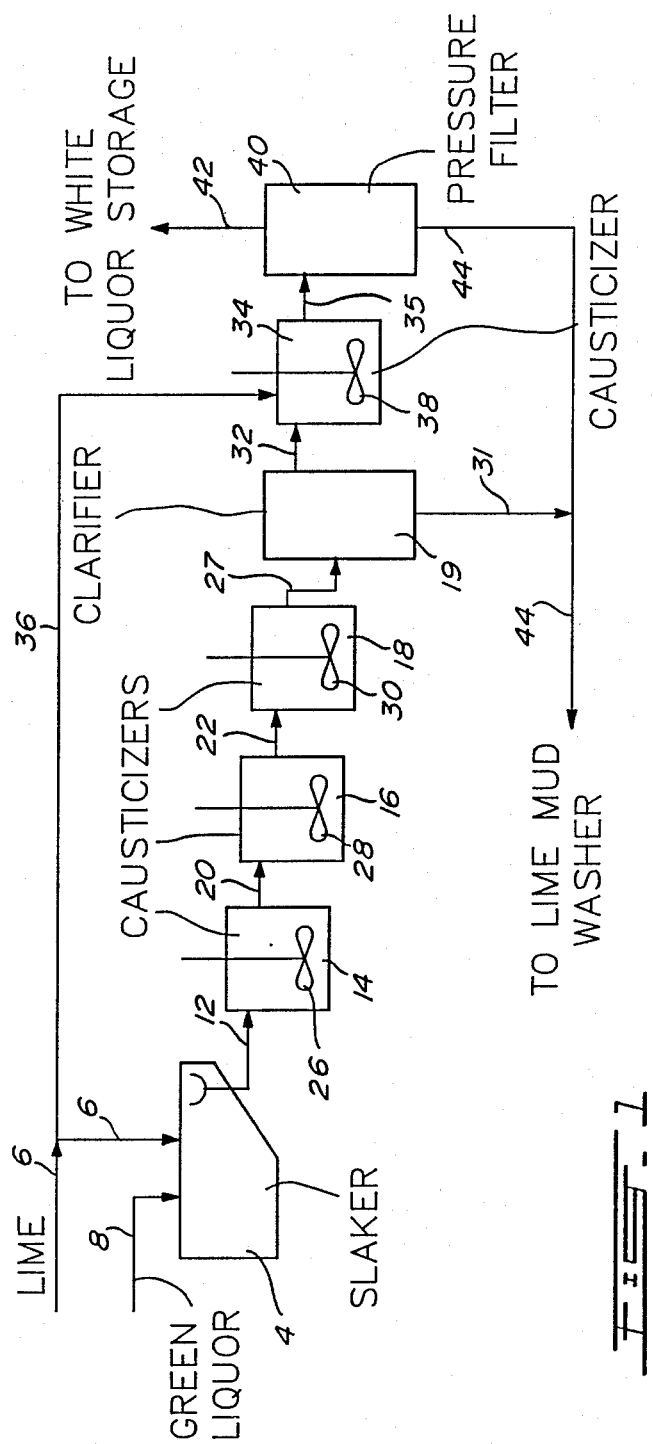
FIG. 1 is a diagrammatic view of the various apparatus components and piping illustrating the flow of the green liquor transformed into a white liquor of high causticity.

In order to conduct step (a) a convenient way is to add in a slaker 4 as shown in FIG. 1, between 78–82% of the stoichiometric amount of lime necessary to be fed via line 6 to react with the amount of Na$_2$CO$_3$ present in the green liquor fed via line 8, and allowing the lime to produce calcium hydroxide. These two reactants are are then fed via line 12 into causticizers, such as for example, illustrated at 14, 16 and 18 that are mounted in series via lines 20 and 22. These causticizers are provided with agitators for instance, mechanical stirrers 26, 28 and 30 in order to well mix the reactants and maintain them in state of uniform solution. The residence time in the causticizers is, for sake of example, of the order of an hour and a half to two. The last of these causticizers shown at 18 is connected to a clarifier 19 via line 27 for feeding thereto the white liquor. The clarifier allows settling of the lime mud by gravity which can be removed via line 31 which may lead into line 44 or be independent. Other means setting density gradient may be used if desired. The supernatant solution in the clarifier having about 20 g/l of solids is then fed via line 32 to another causticizer 34 where lime is further added via line 36 joining line 6.

This further causticization at 34 is carried out to achieve a causticity of about 87% during a time period of about a quarter of an hour to an hour. It may proceed during a period of 40 to 50 minutes, or 40 to 55 minutes when the white liquor contains about 20 g/l of lime mud solid. When the white liquid contains about 60 g/l of lime mud solid, the causticizing can proceed in less than 30 minutes. The causticizer is also provided with a mechanical stirrer 38 to homogeneously mix the reactant after which it is displaced via line 35 to be filtered at 40. The white liquor is collected at 42 for further use, while the lime mud is collected via line 44 leading into joining line 31.

The stoichiometric amount of lime necessary to react with the amount of Na$_2$CO$_3$ present in the green liquor can be determined by titration or conductivity as is well known in the art, such as described by R. G. MacDonald and Franklin in Pulp & Paper Manufacture, published by McGraw-Hill Book Company.

EXAMPLES

The following examples will serve to illustrate particular embodiments of the invention.

SAMPLE A

Figure 2:
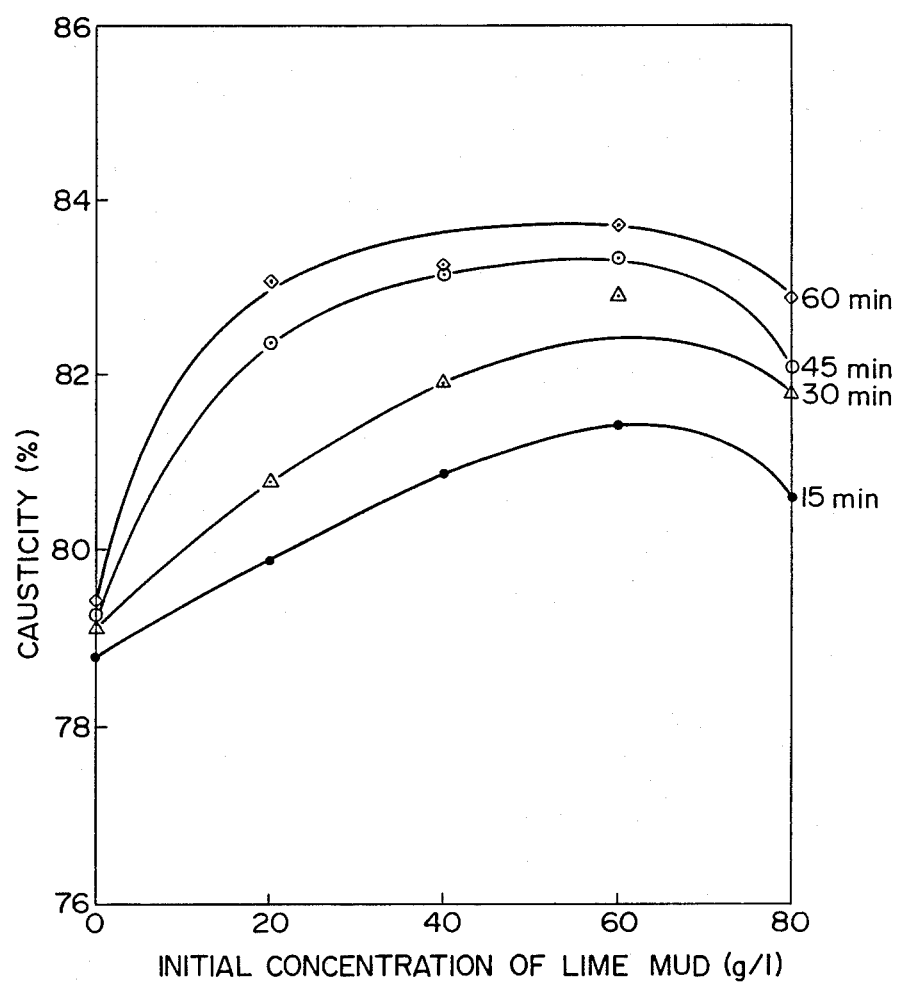
FIG. 2 is a 3-dimensional graph illustrating the effect of lime mud concentration on causticity wherein the abscissa is indicative of the initial concentration of lime mud in grams per liter (g/l), the ordinate is indicative of causticity and the 3rd dimension is indicative of the time in minutes.

A 760 ml of filtered white liquor containing about 115 g/l Total Titrable Alkalies (TTA) and 23% sulphidity was causticized with 46 g of fresh lime. The initial causticity of the white liquor was 80.1% and within a reaction time of 30 mins it increased to 82.6% (FIG. 2). It further increased to 84.6 in 60 mins. However, the equilibrium causticity of 88.6% was achieved after 20 hrs.

This finding indicated that in accordance with prior art, the causticizing of white liquor is a slow process and the equilibrium causticity could not be achieved within a reasonable time.

EXAMPLE 1

During test starting with green liquor, a faster reaction rate was observed when fresh lime was added to the causticized liquor containing lime mud. It was therefore suspected that lime mud had some "catalytic effect" on the causticizing of white liquor. Further experiments were therefore conducted to confirm the observation.

The following experiments were conducted in order to determine the causticity versus lime mud concentration and reaction time.

Such as is described in Pulp and Paper Manufacture already mentioned (2nd Edition) under 9-59, page 563 to 566.

The causticizing reaction was carried out in a reactor having a lid to prevent evaporation and a port for sampling the slurry. The reactor contained a known volume of liquid and a known weight of lime mud, at a known constant temperature measured with a thermocouple and a thermometer. The stirrer was turned on while heating the slurry to the desired temperature, at which point the quantity of lime required to bring the liquor causticity to equilibrium was added. A stopwatch was started when the lime was added and the slurry was sampled every 15 minutes. A sample of the slurry was also collected before adding the lime. These samples were immediately filtered to stop further reaction between the lime and sodium carbonate. The filtrate was then analysed: One may, if desired use the ABC titration, to determine sodium hydroxide, sodium carbonate, and sodium sulphide, or use any instrument to that effect. The ABC titration involves the determination of sodium hydroxide, sodium sulphide and sodium carbonate.

| Time mins. | Causticity % |
|---|---|
| 0 | 77.81 |
| 15 | 78.81 |
| 32 | 79.14 |
| 45 | 79.22 |
| 60 | 79.15 |

The settling rate was determined as follows:

Five hundred ml of the slurry samples which had been causticized for 60 mins were vigorously stirred, transferred to 500 ml graduated cylinders and allowed to settle. A stopwatch was started when the slurry was transferred to the beaker. Then the extent of the settling, i.e. the level of the interface between the clarified liquor and the settling mass, was noted at regular intervals.

The settling rate was determined to be 3.24 cm/minute.

The results were plotted as shown in FIG. 2.

EXAMPLE 2

The following results were obtained with green liquor havig a lime mud concentration of 20 g/l.

| Temperature 0° C. | Time mins. | Causticity % |
|---|---|---|
| 82.0 | 0 | 78.6 |
| 84.1 | 15 | 79.9 |
| 84.2 | 30 | 80.8 |
| 84.4 | 45 | 82.4 |
| 84.4 | 60 | 83.1 |

The results are plotted in FIG. 2.

The settling rate was determined and found to be 1.36 cm/minute.

EXAMPLE 3

The following results were obtained with a green liquor having a lime mud concentration of 40 g/l.

| Temperature 0° C. | Time mins. | Causticity % |
|---|---|---|
| 81.9 | 0 | 78.0 |
| 84.0 | 15 | 80.9 |
| 84.1 | 30 | 82.0 |
| 84.0 | 45 | 83.2 |
| 84.1 | 60 | 83.3 |

The results are plotted in FIG. 2.

The settling rate was also determined and found to be 0.36 cm/minute.

EXAMPLE 4

The following results were obtained with a green liquor having a lime mud concentration of 60 g/l.

| Temperature 0° C. | Time mins. | Causticity % |
|---|---|---|
| 82.4 | 0 | 78.0 |
| 84.4 | 15 | 81.5 |
| 84.5 | 30 | 83.0 |
| 84.5 | 45 | 83.4 |
| 84.5 | 60 | 83.8 |

The results were plotted as shown in FIG. 2.

The settling rate was determined and found to be 0.32 cm/minute.

EXAMPLE 5

The following results were obtained with a green liquor having a lime mud concentration of 80 g/l.

| Temperature 0° C. | Time mins. | Causticity % |
|---|---|---|
| 82.0 | 0 | 78.0 |
| 84.4 | 15 | 80.7 |
| 84.2 | 30 | 81.9 |
| 84.9 | 45 | 82.2 |
| 84.9 | 60 | 83.0 |

These results were then plotted as shown in FIG. 2.

The settling rate was determined and found to be 0.27 cm/minute.

DISCUSSION FROM THE EXAMPLES

As can be easily seen, a plot of white liquor causticity versus lime mud concentration at different reaction times, indicates an optimum level of lime concentration (FIG. 2). The causticity levels off around 40 g/l then decreases after 60 g/l, especially at high reaction times (more than 45 mins). At 60 mins reaction time, the white liquor causticity is 83.1% to 20 g/l compared to 83.3% at 40 g/l, 83.8% at 60 g/l and 83/0% at 80 g/l. However, at low reaction times (less than 30 mins) the causticity increased almost linearly up to the optimum level of 60 g/l. These results indicate that, in practice, lime mud concentrations as low as 20 g/l can be used to improve the white liquor causticity if adequate reaction time (more then 45 mins) can be provided. However, if sufficient reaction time cannot be provided (less than 30 mins) than lime mud concentration as high as 60 g/l should be used.

As can be seen when the normal level of lime mud in white liquor is above 60 as is generally encountered after a set of causticizers in series, say 80 g/l, from the above FIG. 2 it is clear that the lime mud have to be significantly reduced before fresh lime is added to maximize the causticity without adversely affecting the settling rate.

In combining the results of both the causticizing and settling tests initial lime mud concentration of 20 g/l corresponding to 3.5% solids in the final slurry appears to be the optimum. The causticity levels off at initial lime mud concentration of 20 g/l and the settling rate for this sample at room temperature at 1.36 cm/minute is expected to be within the range of 1.5 to 3.0 cm/minute which is the acceptable range within the industry at 90° C.

If desired, the lime mud may be separated from the white liquor in the last separation unit (pressure filter 40) and recycled to the slaker 4. This permits excess lime to be added in the last causticizer and thereby achieve causticity close to the equilibrium within a reasonable period of time.

Having described the invention, particularly preferred embodiments thereof, modifications will be evident to those skilled in the art without departing from the spirit of the invention as defined in the appended claims.

I claim:

1. A method to increase the efficiency of a causticizing process which comprises:
   (a) adding to a green liquor between 78 and 82% of the stoichiometric amount of lime necessary to react with the amount of $Na_2CO_3$ present in the green liquor to obtain a causticized white liquor containing NaOH and lime mud,
   (b) partially clarifying said white liquor by extracting the lime mud present to obtain a white liquor having a total lime mud solid concentration of about 10-60 grams/liter,
   (c) taking said white liquor containing about 10-60 grams/liter of solid and adding an additional amount of lime to increase the causticity to about 87%,
   (d) allowing further causticizing reaction between the lime and $Na_2CO_3$ during a period of about a quarter of an hour to an hour, and
   (e) removing the remaining lime mud present to obtain a white liquor which has the causticity of about 87%.

2. The method as defined in claim 1 wherein in step (b) the white liquor is clarified to obtain a total lime mud solid concentration of about 20-40 grams/liter.

3. The method as defined in claim 1 wherein in step (b) the white liquor is clarified to obtain a total lime mud solid concentration of about 20 grams/liter.

4. A method to increase the efficiency of a causticizing process which comprises:
   (a) adding to a green liquor in a slaker, between 78 and 82% of the stoichiometric amount of lime necessary to react with the amount of $Na_2CO_3$ present in the green liquor, said lime in the presence of said green liquor producing calcium hydroxide, and allowing the calcium hydroxide to react with the $Na_2CO_3$ in causticizers mounted in series to obtain a caustilized white liquor containing NaOH and lime mud,
   (b) feeding into a clarifier having a top and bottom portion said white liquor from the last causticizer mounted in series, and extracting at the bottom portion of said clarifier a portion of the lime mud present to obtain from the top portion a white liquor having a total lime mud solid concentration of between 10 to 60 grams/liter,
   (c) taking said white liquor containing between 10 to 60 grams/liter of lime mud solid and feeding it to a further causticizer with an additional amount of lime to increase the causticity to about 87%,
   (d) allowing further causticizing reaction under agitation between the lime and $Na_2CO_3$, during a period of about a quarter of an hour to an hour, and
   (e) removing the remaining lime mud present to obtain a white liquor which has the causticity of about 87%.

5. The method according to claim 4 wherein step (e) is conducted by filtration.

6. The method according to claim 4 wherein steps a to e are allowed to proceed continuously.

7. The method according to claim 4 wherein in step (d) the causticizing reaction is allowed to proceed during a period of about 40 to 50 minutes.

8. The method according to claim 4 wherein in step (c) said white liquor contains about 20 grams of total lime mud solid and in step (d) the causticizing is allowed to proceed about 40 to 55 minutes.

9. The method according to claim 4 wherein step (c) said white liquor contains about 60 grams of total lime mud solid and in step (d) the causticizing is allowed to proceed less than 30 minutes.

10. The method according to claim 4 wherein step (a) in the causticizers the calcium hydroxide and $Na_2CO_3$ resides for a period of about 1½ to 2 hours.

* * * * *